US010605237B2

(12) United States Patent
Ko et al.

(10) Patent No.: US 10,605,237 B2
(45) Date of Patent: Mar. 31, 2020

(54) MULTIPLE OSCILLATING WATER PUMPING DEVICE

(71) Applicant: KOREA INSTITUTE OF OCEAN SCIENCE & TECHNOLOGY (KIOST), Gyeonggi-do (KR)

(72) Inventors: Jin Hwan Ko, Seoul (KR); Patar Ebenezer Sitorus, Gyeonggi-do (KR); Jin Soon Park, Gyeonggi-do (KR)

(73) Assignee: Korea Institute of Ocean Science & Technology (KIOST), Gyeonggi-do (KR)

( * ) Notice: Subject to any disclaimer, the term of this patent is extended or adjusted under 35 U.S.C. 154(b) by 466 days.

(21) Appl. No.: 15/249,753

(22) Filed: Aug. 29, 2016

(65) Prior Publication Data

US 2017/0122299 A1     May 4, 2017

(30) Foreign Application Priority Data

Nov. 3, 2015     (KR) ........................ 10-2015-0153972

(51) Int. Cl.
*F04B 17/06*     (2006.01)
*F03D 5/06*     (2006.01)
(Continued)

(52) U.S. Cl.
CPC ............ *F04B 17/06* (2013.01); *F03B 13/264* (2013.01); *F03B 17/06* (2013.01); *F03D 5/06* (2013.01);
(Continued)

(58) Field of Classification Search
CPC .......... F04B 23/06; F04B 53/10; F04B 53/16; F04B 17/06; F04B 53/14; F04B 17/00;
(Continued)

(56) References Cited

U.S. PATENT DOCUMENTS 2,465,285 A * 3/1949 Schwickerath ......... F03B 17/06
                                                                         416/162
4,104,006 A * 8/1978 Meiri ....................... F03D 5/06
                                                                        417/334

(Continued)

FOREIGN PATENT DOCUMENTS

| EP | 1 979 610 B1 | 6/2014 |
|----|----|----|
| JP | 2004360515 A | 12/2004 |
| KR | 10-0937338 | 1/2010 |
| KR | 20130070731 A | 6/2013 |

OTHER PUBLICATIONS

Notification of Reason for Refusal for Korean Application No. 10-2015-0153972, dated Jul. 13, 2017, including English translation, 8 pages.

*Primary Examiner* — Charles G Freay
*Assistant Examiner* — Lilya Pekarskaya
(74) *Attorney, Agent, or Firm* — RatnerPrestia

(57) ABSTRACT

A multiple oscillating water pumping device includes: a wing member disposed in fluid to generate a lifting force using the flow energy of the fluid; a rotation device to reciprocally rotate the wing member to periodically change the direction of the lifting force acting on the wing member; an arm is rotatably coupled to the wing member, the arm being reciprocally rotated about a pivot shaft by the lifting force acting on the wing member; and a cylinder where fluid enters and exits according to the internal pressure that is periodically increased and decreased by the reciprocating motion of a piston that is connected with the arm through a connecting rod. The multiple oscillating water pumping device is configured to minimize the supply of a power source required for operation and to minimize the loss of head when pumped water flows toward a reservoir along a conduit.

4 Claims, 5 Drawing Sheets

(51) Int. Cl.

| | | |
|---|---|---|
| *F03D 9/28* | (2016.01) | |
| *F03B 13/26* | (2006.01) | |
| *F03B 17/06* | (2006.01) | |
| *F04B 17/00* | (2006.01) | |
| *F04B 19/22* | (2006.01) | |
| *F04B 23/06* | (2006.01) | |
| *F04B 53/10* | (2006.01) | |
| *F04B 53/14* | (2006.01) | |
| *F04B 53/16* | (2006.01) | |

(52) U.S. Cl.
CPC ............... *F03D 9/28* (2016.05); *F04B 17/00* (2013.01); *F04B 19/22* (2013.01); *F04B 23/06* (2013.01); *F04B 53/10* (2013.01); *F04B 53/14* (2013.01); *F04B 53/16* (2013.01); *F05B 2210/16* (2013.01); *Y02E 10/28* (2013.01); *Y02E 10/70* (2013.01); *Y02E 10/72* (2013.01)

(58) Field of Classification Search
CPC .... F04B 19/22; F03D 9/28; F03D 5/06; F03B 13/264; F03B 17/06; Y02E 10/72; Y02E 10/28; Y02E 10/70; F05B 2210/16
See application file for complete search history.

(56) References Cited

U.S. PATENT DOCUMENTS

| | | | | |
|---|---|---|---|---|
| 4,465,941 | A * | 8/1984 | Wilson | F03B 13/08 290/42 |
| 4,470,770 | A * | 9/1984 | Grose | F03D 5/06 416/79 |
| 4,507,060 | A * | 3/1985 | Sutz | F03D 7/0208 417/336 |
| 4,525,122 | A * | 6/1985 | Krnac | F03D 5/06 416/80 |
| 4,595,336 | A * | 6/1986 | Grose | F03D 5/06 416/79 |
| 5,009,571 | A * | 4/1991 | Smith | F03D 5/06 416/79 |
| 2002/0061251 | A1* | 5/2002 | McCabe | F03D 1/00 417/336 |
| 2011/0064576 | A1* | 3/2011 | Liu | F03D 5/06 416/82 |
| 2013/0202407 | A1* | 8/2013 | Dumas | F01D 17/06 415/1 |
| 2013/0216381 | A1* | 8/2013 | Liu | F03B 13/264 416/79 |

* cited by examiner (a)　　　　　　　　(b)

MULTIPLE OSCILLATING WATER PUMPING DEVICE

CROSS REFERENCE TO RELATED APPLICATIONS

This application claims priority to Korean Patent Application No. 10-2015-0153972, filed Nov. 3, 2015, the contents of such application being incorporated by reference herein.

BACKGROUND OF THE INVENTION

1. Field of the Invention

The present disclosure relates to a multiple oscillating water pumping device, and more specifically, to a multiple oscillating water pumping device configured such that the supply of a power source required for an operation is minimized and only the minimum number of elements that generate a lifting force using flow energy are disposed in fluid.

2. Description of the Prior Art

Water pumping devices refer to facilities that push up water with a pump from a water reservoir at a low level to a water reservoir at a high level. Water pumping devices are mainly used for industrial or agricultural purposes. In particular, water pumping devices are essential for islands or boring facilities that urban infrastructures (such as an electric facility, a water supply facility, etc.) do not reach or for marine structures (such as a lighthouse, a marine building, etc.) where a few people live.

In this regard, Korean Patent No. 10-0937338, which is incorporated by reference, discloses a water pumping device having a variable water level, which includes: a buoyant means; a motor unit mounted on the upper position of the buoyant means; a water pumping unit that is installed on the lower position of the buoyant means and rotates its impeller with power received from the motor unit to suction and discharge water; and a guide means that prevents the buoyant means from floating during water-pumping and guides the buoyant means such that the buoyant means may vertically move upward according to the water level.

The water pumping device disclosed in KR Patent No. 10-0937338 is installed while being floated on the water, and the intake hole thereof is spaced apart from the bottom of a salt farm, a sewage disposal tank, or a drainage tank, which makes it possible to prevent foreign substances or soil from being introduced during water-pumping and to prevent, in advance, damage to the motor, which is caused by the blockage of the intake hole.

However, the conventional water pumping device disclosed in KR Patent No. 10-0937338 has to drive a lifting pump, so its usability is degraded on account of the difficulty in consistently supplying a power source (such as, oil fuel, etc.) required for driving a lifting pump and a generator to islands or marine structures with restricted accessibility.

In this regard, a tidal energy system is disclosed in EP Patent No. 1979610, which is incorporated by reference. Although the tidal energy system disclosed in EP Patent No. 1979610 drives a water pumping device by rotating a propeller type rotation means using the flow energy of the tide, it is difficult to install the propeller type rotation means on shore or near an underwater structure since the rotation means has to be completely submerged in the water. Further, since the water pumping device is installed to be submerged in the water, high water tightness is required for the water pumping device, and even though the water pumping device is installed in the water, there may be difficulty in maintaining the water pumping device installed in the water.

CITATION LIST

Patent Document (0001) KR Patent No. 10-037338 (registered on Jan. 10, 2010)
(0002) EP Patent No. 1979610 (registered on Jun. 4, 2014)

SUMMARY OF THE INVENTION

An aspect of the present disclosure is to provide a multiple oscillating water pumping device configured to minimize the supply of a power source required for an operation and to minimize the loss of head in a process in which pumped water flows toward a reservoir along a conduit.

Another aspect of the present disclosure is to provide a multiple oscillating water pumping device that prevents water pumping efficiency from being deteriorated by interference with rain or wind while only the minimum number of elements that generate a lifting force using flow energy are disposed in fluid.

The aspects are accomplished by a multiple oscillating water pumping device, according to the present disclosure, which includes: a first wing member disposed in fluid to generate a lifting force using the flow energy of the fluid; a first rotation means configured to reciprocally rotate the first wing member to periodically change the direction of the lifting force acting on the first wing member; a first arm to which the first wing member is rotatably coupled, the first arm being reciprocally rotated about a first pivot shaft by the lifting force acting on the first wing member; and a first cylinder where fluid enters and exits according to the internal pressure that is periodically increased and decreased by the reciprocating motion of a first piston that is connected with the first arm through a first connecting rod.

A rotating shaft of the first wing member may be vertically formed to extend to the outside of the fluid, and the first arm, outside the fluid, may be rotatably coupled with the rotating shaft of the first wing member.

One pair of first cylinders and one pair of first connecting rods may be provided; the first connecting rods, on opposite sides of the first pivot shaft, may be rotatably coupled with the first arm such that variations in the internal pressures of the first cylinders are reversed; and fluids that are discharged from the first cylinders and join with each other in the main tube may form a continuous flow in the main tube.

The first cylinder may include: a body in which the first piston is configured to reciprocate; an intake part connected with the body and having a first check valve installed therein for preventing fluid from flowing out of the body when the internal pressure of the first cylinder increases; and a discharge part connected with the body and having a second check valve installed therein for preventing fluid from flowing into the body when the internal pressure of the first cylinder decreases.

The multiple oscillating water pumping device may further include: a second wing member disposed in the fluid to generate a lifting force using the flow energy of the fluid; a second rotation means configured to reciprocally rotate the second wing member to periodically change the direction of the lifting force acting on the second wing member; a second arm to which the second wing member is rotatably coupled, the second arm being reciprocally rotated about a second pivot shaft by the lifting force acting on the second wing member; and a second cylinder where fluid enters and exits according to the internal pressure that is periodically increased and decreased by the reciprocating motion of a second piston that is connected with the second arm the rough a second connecting rod, and the first and second arms may be configured to reciprocally rotate while maintaining a predetermined phase difference therebetween.

The multiple oscillating water pumping device may further include: a first interlocking unit configured to transmit the rotating force of the first arm to a rotating shaft of the second wing member; and a second interlocking unit configured to transmit the rotating force of the second arm to a rotating shaft of the first wing member, and the first and second arms may be reciprocally rotated by the first and second interlocking units while maintaining a predetermined phase difference therebetween.

One pair of second cylinders and one pair of second connecting rods may be provided; the second connecting rods, on opposite sides of the second pivot shaft, may be rotatably coupled with the second arm such that variations in the internal pressures of the second cylinders are reversed; and fluids that are discharged from the first and second cylinders and join with each other in the main tube may form a continuous flow in the main tube.

The first interlocking unit may include: a (1-1)th rotary member coupled to the first pivot shaft and reciprocally rotated by the first arm; a (1-2)th rotary member coupled to the second pivot shaft so as to idle and configured to rotate in conjunction with the (1-1)th rotary member; and a (1-3)th rotary member coupled to the rotating shaft of the second wing member and configured to rotate in conjunction with the (1-2)th rotary member, and the second interlocking unit may include: a (2-1)th rotary member coupled to the second pivot shaft and reciprocally rotated by the second arm; a (2-2)th rotary member coupled to the first pivot shaft so as to idle and configured to rotate in conjunction with the (2-1)th rotary member; and a (2-3)th rotary member coupled to the rotating shaft of the first wing member and configured to rotate in conjunction with the (2-2)th rotary member.

Accordingly, the present disclosure may provide a multiple oscillating water pumping device in which an interlocking unit transmits the rotating force of an arm at one side to a rotating shaft of a wing member at the other side, thereby minimizing the supply of a power source required for an operation.

Further, the present disclosure may provide a multiple oscillating water pumping device in which one pair of first connecting rods, on opposite sides of the first pivot shaft, is rotatably coupled with the first arm, thereby minimizing the loss of head in a process in which pumped water flows toward a reservoir along a conduit.

In addition, the present disclosure may provide a multiple oscillating water pumping device in which the rotating shaft of the first wing member is rotatably coupled with the first arm outside fluid so that it is possible to prevent water pumping efficiency from being deteriorated by interference with rain or wind while only the minimum number of elements that generate a lifting force using flow energy are disposed in the fluid.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, exemplary embodiments of the present disclosure will be described in detail with reference to the accompanying drawings. In the description of the present disclosure, the description of the well-known function or structure will be omitted in order to clear the subject matter of the present disclosure.

A multiple oscillating water pumping device of the present disclosure is configured to minimize the supply of a power source required for an operation and to minimize the loss of head in a process in which pumped water flows toward a reservoir along a conduit.

In addition, a multiple oscillating water pumping device of the present disclosure is configured to prevent water pumping efficiency from being deteriorated by interference with rain or wind while only the minimum number of elements that generate a lifting force using flow energy are disposed in fluid.

Figure 1:
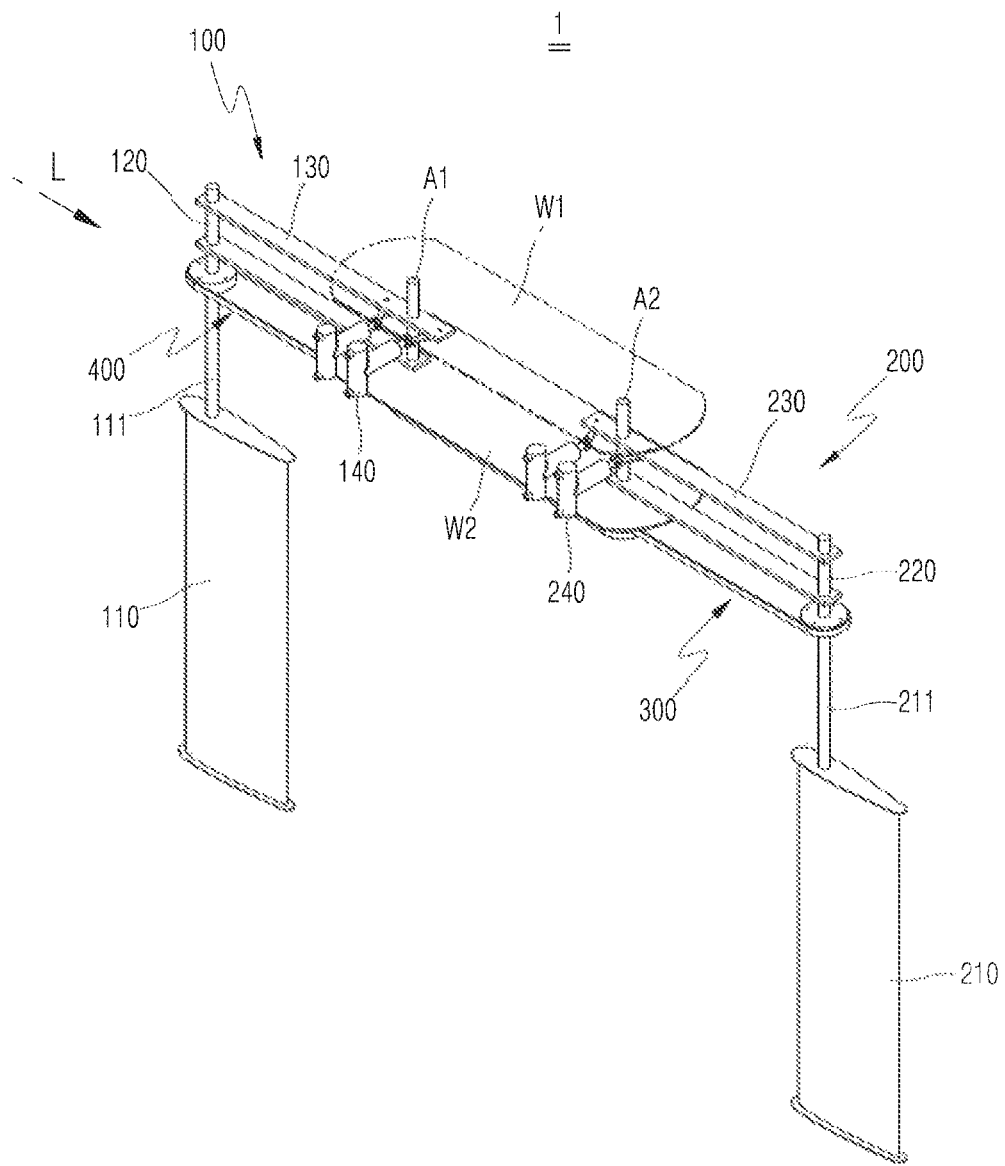
FIG. 1 is a perspective view of a multiple oscillating water pumping device according to an embodiment of the present disclosure.
Figure 2:
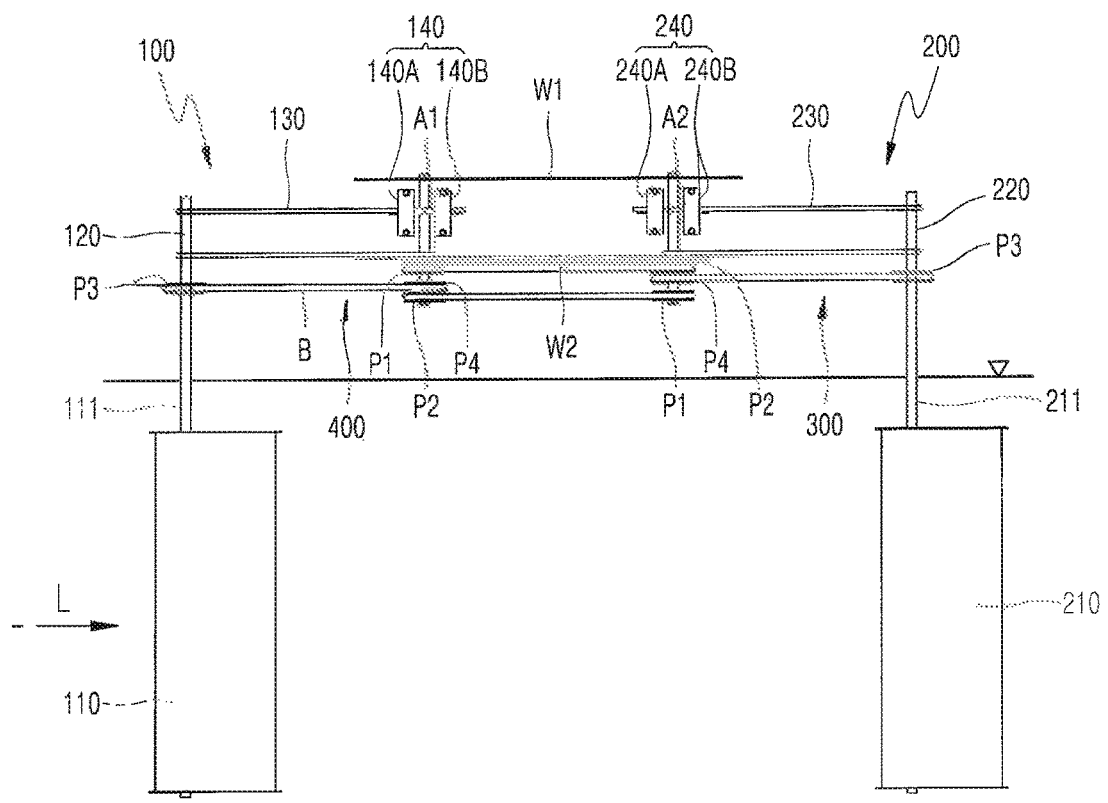
FIG. 2 is a side view of the multiple oscillating water pumping device of FIG. 1.
Figure 3:
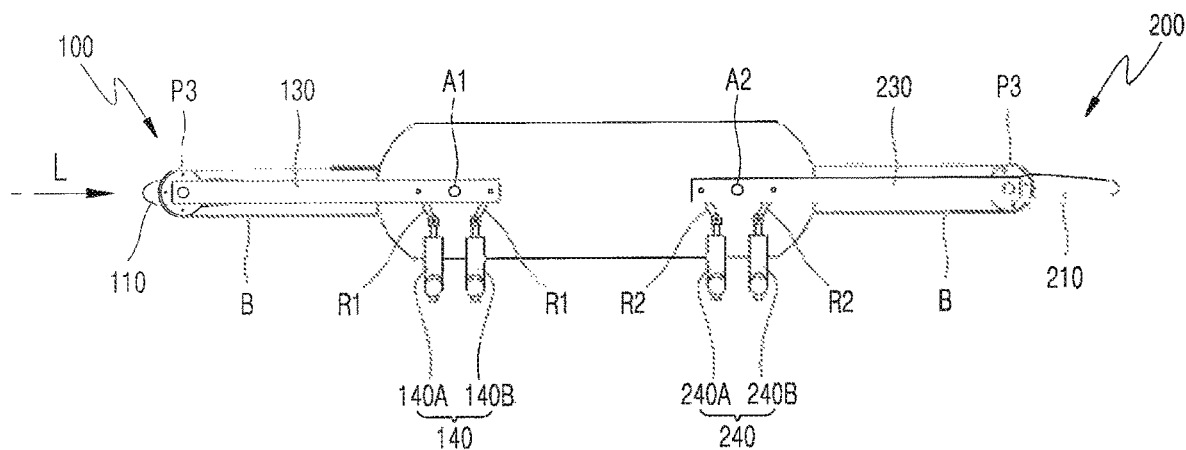
FIG. 3 is a plan view of the multiple oscillating water pumping device of FIG. 1.
Figure 4A:
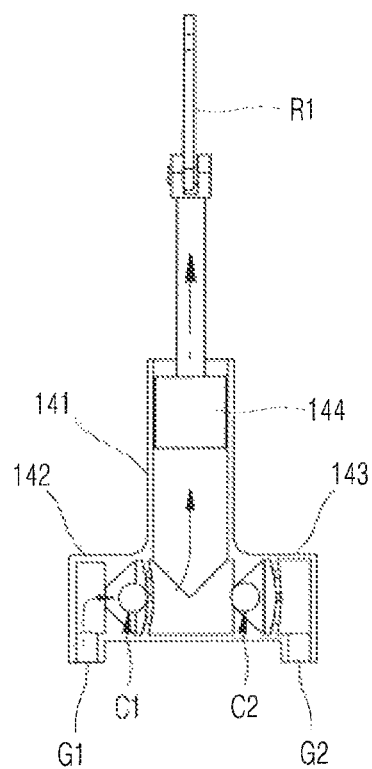
FIGS. 4A and 4B are views illustrating a first cylinder of the multiple oscillating water pumping device of FIG. 1.
Figure 4B:
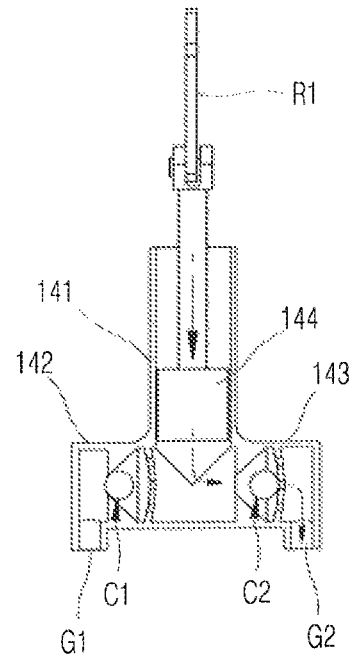

FIG. 1 is a perspective view of a multiple oscillating water pumping device according to an embodiment of the present disclosure. FIG. 2 is a side view of the multiple oscillating water pumping device of FIG. 1. FIG. 3 is a plan view of the multiple oscillating water pumping device of FIG. 1. FIGS. 4A and 4B are views illustrating a first cylinder of the multiple oscillating water pumping device of FIG. 1. FIGS. 5A-5D are views illustrating a series of operations of the multiple oscillating water pumping device of FIG. 3 within a period. FIGS. 6A and 6B are views illustrating a state in which a multiple oscillating water pumping device, according to another embodiment of the present disclosure, is used.

As illustrated in FIGS. 1 to 3, the multiple oscillating water pumping device 1, according to the embodiment of the present disclosure, is configured such that: the supply of a power source required for an operation is minimized; and only the minimum number of elements that generate a lifting force using flow energy are disposed in fluid. The multiple oscillating water pumping device 1 includes a first water pumping unit 100, a second water pumping unit 200, a first interlocking unit 300, and a second interlocking unit 400.

The first water pumping unit 100 and the second water pumping unit 200 are configured to independently pump fluid using the flow energy of the fluid, and a rotating force is transmitted therebetween by the first interlocking unit 300 and the second interlocking unit 400. Accordingly, the first and second water pumping units 100 and 200 may pump fluid even when the first and second interlocking units 300 and 400 are not installed, and only the first water pumping unit 100 may be separately installed.

The multiple oscillating water pumping device 1 of the present disclosure may be installed in a stream, an artificial water channel, a river, or an ocean, in which fluid flows, to pump water. Hereinafter, it will be exemplified that the water pumping device is installed in an ocean in which the tide flows. L denotes the flow direction of the tide.

As illustrated in FIGS. 1 to 3, the first water pumping unit 100 includes a first wing member 110, a first rotation means 120, a first arm 130, and a first cylinder 140.

The first wing member 110 is disposed below the surface of water to generate a lifting force using the flow energy of the tide. The first wing member 110 substantially has a wing shape. The first wing member 110 has a streamlined shape when viewed in the plan view (see FIG. 3).

The leading edge of the first wing member 110 is thicker than the trailing edge in the plan view (see FIG. 3), and the first wing member 110 is arranged such that the tide flows from the leading edge toward the trailing edge thereof. In other words, the leading edge is disposed further upstream than the trailing edge on the basis of the flow of the tide.

The rotating shaft 111 of the first wing member 110 is vertically formed to extend to the outside of the fluid.

As illustrated in FIGS. 1 and 2, the first rotation means 120, which is an element that reciprocally rotates the first wing member 110, is constituted by a motor that is rotated in both directions by a controller (not illustrated).

The first rotation means 120 transmits a periodic bidirectional rotating force to the rotating shaft 111 of the first wing member 110 while being coupled to an end position of the first arm 130. The rotating shaft of the first rotation means 120 may be connected to the rotating shaft 111 of the first wing member 110 directly or through a gear or pulley.

As illustrated in FIG. 2, the first rotation means 120 above the surface of the water rotates the rotating shaft 111 of the first wing member 110. The first wing member 110 is periodically rotated in both directions by the first rotation means 120, and the direction of the lifting force acting on the first wing member 110 is periodically changed accordingly.

The first arm 130 is reciprocally rotated about a first pivot shaft A1 by the lifting force acting on the first wing member 110, and is formed in a long bar shape. The first arm 130 is provided outside the fluid, and the rotating shaft 111 of the first wing member 110 is rotatably coupled to the end position of the first arm 130.

The first pivot shaft A1, which is a vertical shaft, is rotatably coupled to stationary objects. The stationary objects are illustrated as first and second plates W1 and W2 in FIGS. 1 to 3. Although not illustrated in detail, the first and second plates W1 and W2 should be understood as a part of a stationary structure that is constructed on shore, or on a marine structure, in order to secure the water pumping device 1.

As illustrated in FIGS. 4A and 4B, the first cylinder 140 has a configuration in which fluid flows into, or out of, the first cylinder 140 according to a periodic variation in the internal pressure of the first cylinder, which is caused by the reciprocating motion of a first piston 144, and the first piston 144 is connected with the first arm 130 through a first connecting rod R1.

Referring to FIGS. 3 and A-4B, the first arm 130 horizontally rotates about the first pivot shaft A1 that is vertically arranged, and the first piston 144 reciprocates in a direction perpendicular to the first pivot shaft A1, that is, in a horizontal direction.

The first connecting rod R1, which is an element that converts the rotary motion of the first arm 130 into the reciprocating motion of the piston, is rotatably connected, at the opposite ends thereof, to the first arm 130 and the first piston 144.

When the first arm 130 rotates, the entire first connecting rod moves upward and downward while swinging to the left and right, similar to a pendulum, about the position thereof connected to the first piston 144, thereby converting the rotary motion of the first arm 130 into the reciprocating motion of the piston.

As illustrated in FIGS. 4A and 4B, the first cylinder 140 includes a body 141, an intake part 142, and a discharge part 143.

The body 141 is formed in a cylindrical shape, and the internal pressure of the body 141 increases or decreases as the first piston 144 reciprocates within the body 141.

When the first piston 144 moves toward the first connecting rod R1, as illustrated in FIG. 4A, the pressure in the body 141 decreases, and when the first piston 144 moves away from the first connecting rod R1, as illustrated in FIG. 4B, the pressure in the body 141 increases.

When the internal pressure of the body 141 decreases, fluid flows into the body 141 through the intake part 142, and when the internal pressure of the body 141 increases, the fluid flows out of the body 141 through the discharge part 143.

A first check valve C1 is installed inside the intake part 142, and a second check valve C2 is installed inside the discharge part 143. The first and second check valves C1 and C2 are configured to selectively block the flow passage of fluid by moving balls.

As, illustrated in FIG. 4B, when the internal pressure of the body 141 increases, the first check valve C1 blocks the passage within the intake part 142 to prevent fluid from flowing out of the body through the intake part 142, and as illustrated in F, when the internal pressure of the body 141 decreases, the second check valve C2 blocks the passage within the discharge part 143 to prevent fluid from flowing into the body through the discharge part 143.

Although not illustrated, a pipe for hose (hereinafter, referred to as a 'conduit') through which fluid flows is coupled, at one end position thereof, to the inlet G1 of the intake part 142. The other end position of the conduit connected with the inlet G1 is located below the surface of water.

Although not illustrated, a conduit through which fluid flows is also coupled, at one end position thereof, to the outlet G2 of the discharge part 143. The other end position of the conduit connected with the outlet G2 is connected to a reservoir (not illustrated) that stores pumped water. The water stored in the reservoir by the water pumping device 1 may be used as drinking water through a desalination apparatus (not illustrated), or may be used to generate electric power in a hydro power generator (not illustrated).

In the process of moving to the reservoir, the water pumped by the reciprocating motion of the first piston 144 flows from the interior of the conduit toward the reservoir when the internal pressure of the first cylinder 140 increases, and the water stagnates within the conduit when the internal pressure of the first cylinder 140 decreases. The periodic stag nation of water may cause an increase in the loss of head within the conduit so that the amount of water to be pumped may be reduced.

As illustrated in FIGS. 1 to 3, a pair of first cylinders 140 and a pair of first connecting rods R1 are provided. On opposite sides of the first pivot shaft A1, the first connecting rods R1 may be rotatably coupled with the first arm 130. Although not illustrated, the fluids discharged from the pair of first cylinders 140 through the outlets G2 join together in the main tube and then flow toward the reservoir.

Since the first connecting rods R1, on the opposite sides of the first pivot shaft A1, are rotatably coupled with the first arm 130, the first connecting rods R1 move away from each other with respect to the first pivot shaft A1, and the reciprocating motions of the first pistons 144, which are connected with the first connecting rods R1, form a phase difference of ½ periods accordingly so that variations in the internal pressures of the first cylinders 140 are reversed.

Accordingly, the fluids discharged from the pair of first cylinders 140 through the outlets G2 join together in the main tube while forming the phase difference of ½ periods and form a continuous flow that does not stagnate. The continuous flow of water may decrease the loss of head within the tube, thereby increasing the amount of water to be pumped.

As illustrated in FIGS. 1 to 3, the second water pumping unit 200 is disposed on the rear side of the first water pumping unit 100 on the basis of the flow of the tide.

The flow of the tide may have a difference in the speed and direction according to the abscissa and ordinate in the seawater. Although the first wing member 110 at the upstream side partially interferes with the tide that flows toward the second wing member 210 at the downstream side, the second wing member 210 may be disposed such that the kinetic energy of the tide is increased by the vortex that is generated by the first wing member 110, or the magnitudes of the lifting forces acting on the first and second wing members 110 and 210 may be made similar to each other by adjusting the sizes of the wing members.

As illustrated in FIGS. 1 to 3, the second water pumping unit 200 includes the second wing member 210, a second rotation means 220, a second arm 230, and a second cylinder 240.

The second wing member 210 is disposed below the surface of the water to generate a lifting force using the flow energy of the tide. The second wing member 210 substantially has a wing shape. The second wing member 210 has a streamlined shape when viewed in the plan view (see FIG. 3).

The leading edge of the second wing member 210 is thicker than the trailing edge in the plan view (see FIG. 3), and the second wing member 210 is arranged such that the tide flows from the leading edge toward the trailing edge thereof.

The rotating shaft 211 of the second wing member 210 is vertically formed to extend to the outside of the fluid.

As illustrated in FIGS. 1 to 3, the second water pumping unit 200 is symmetric to the first water pumping unit 100 and operates in substantially the same way as the first water pumping unit 100. Accordingly, a detailed description of the second rotation means 220, the second arm 230, and the second cylinder 240 will be omitted because it is substantially the same as the description of the first water pumping unit 100.

Here, unexplained reference numeral R2 denotes a second connecting rod, and unexplained reference numerals 241, 242, and 243 denote a body, an intake part, and a discharge part of the second cylinder 240, respectively.

As illustrated in FIGS. 1 to 3, the first interlocking unit 300, which is an element for transmitting a part of the rotating force of the first arm 130 to the rotating shaft 211 of the second wing member 210, includes a (1-1)th rotary member P1, a (1-2)th rotary member P2, a (1-3)th rotary member P3, and a (1-4)th rotary member P4.

The (1-1)th rotary member P1 is coupled to the first pivot shaft A1 and is reciprocally rotated by the first arm 130, and the (1-2)th rotary member P2 is connected to the (1-1)th rotary member P1 through a belt B or chain to rotate in conjunction with the (1-1)th rotary member P1 while being coupled to the second pivot shaft A2 so as to idle.

The (1-4)th rotary member P4 is coupled with the (1-2)th rotary member P2 to receive the rotating force of the (1-2)th rotary member P2, and the (1-3)th rotary member P3 is connected to the (1-4)th rotary member P4 through a belt B or chain to rotate in conjunction with the (1-4)th rotary member P4 while being coupled to the rotating shaft 211 of the second wing member 210.

Accordingly, a part of the rotating force of the first pivot shaft A1 is transmitted to the rotating shaft 211 of the second wing member 210 through the (1-1)th rotary member P1, the (1-2)th rotary member P2, the (1-3)th rotary member P3, and the (1-4)th rotary member P4.

As, illustrated in FIGS. 1 to 3, the second interlocking unit 400, which is an element for transmitting a part of the rotating force of the second arm 230 to the rotating shaft 111 of the first wing member 110, includes a (2-1)th, rotary member P1, a (2-2)th rotary member P2, a (2-3)th rotary member P3 and a (2-4)th rotary member P4.

The (2-1)th rotary member P1 is coupled to the second pivot shaft A2 and is reciprocally rotated by the second arm 230, and the (2-2)th rotary member P2 is connected to the (2-1)th rotary, member P1 through a belt B or chain to rotate in conjunction with the (2-1)th rotary member P1 while being coupled to the first pivot shaft A1 so as to idle.

The (2-4)th rotary member P4 is coupled with the (2-2)th rotary member P2 to receive the rotating force of the (2-2)th rotary member P2, and the (2-3)th rotary member P3 is connected to the (2-4)th rotary member P4 through a belt B or chain to rotate in conjunction with the (2-4)th rotary member P4 while being coupled to the rotating shaft 111 of the first wing member 110.

Accordingly, a part of the rotating force of the second pivot shaft A2 is transmitted to the rotating shaft 111 of the first wing member 110 through the (2-1)th rotary member P1, the (2-2)th rotary member P2, the (2-3)th rotary member P3, and the (2-4)th rotary member P4.

In the multiple, oscillating water pumping device 1 of the present disclosure, the energy used for operating the first and second rotation means 120 and 220 is minimized by the transmission of the rotating force between the first and second water pumping, units 100 and 200 through the first and second interlocking units 300 and 400.

As illustrated in FIGS. 5A-5D, the first and second arms 130 and 230 are reciprocally rotated with a predetermined phase difference therebetween by the first and second interlocking units 300 and 400.

FIGS. 5A-5D are schematic views illustrating the reciprocal rotary motion of the first arm 130, which reciprocally rotates about the first pivot shaft A1, and the reciprocal rotary motion of the second arm 230, which reciprocally rotates about the second pivot shaft A2, in units of ¼ periods.

For ease of understanding, a description will be given referring to the state illustrated in FIG. 5A as a first period, the state illustrated in FIG. 5B as a second period, the state illustrated in FIG. 5C as a third period, and the state illustrated in FIG. 5D as a fourth period.

Figures 5A, 5B, 5C, 5D:
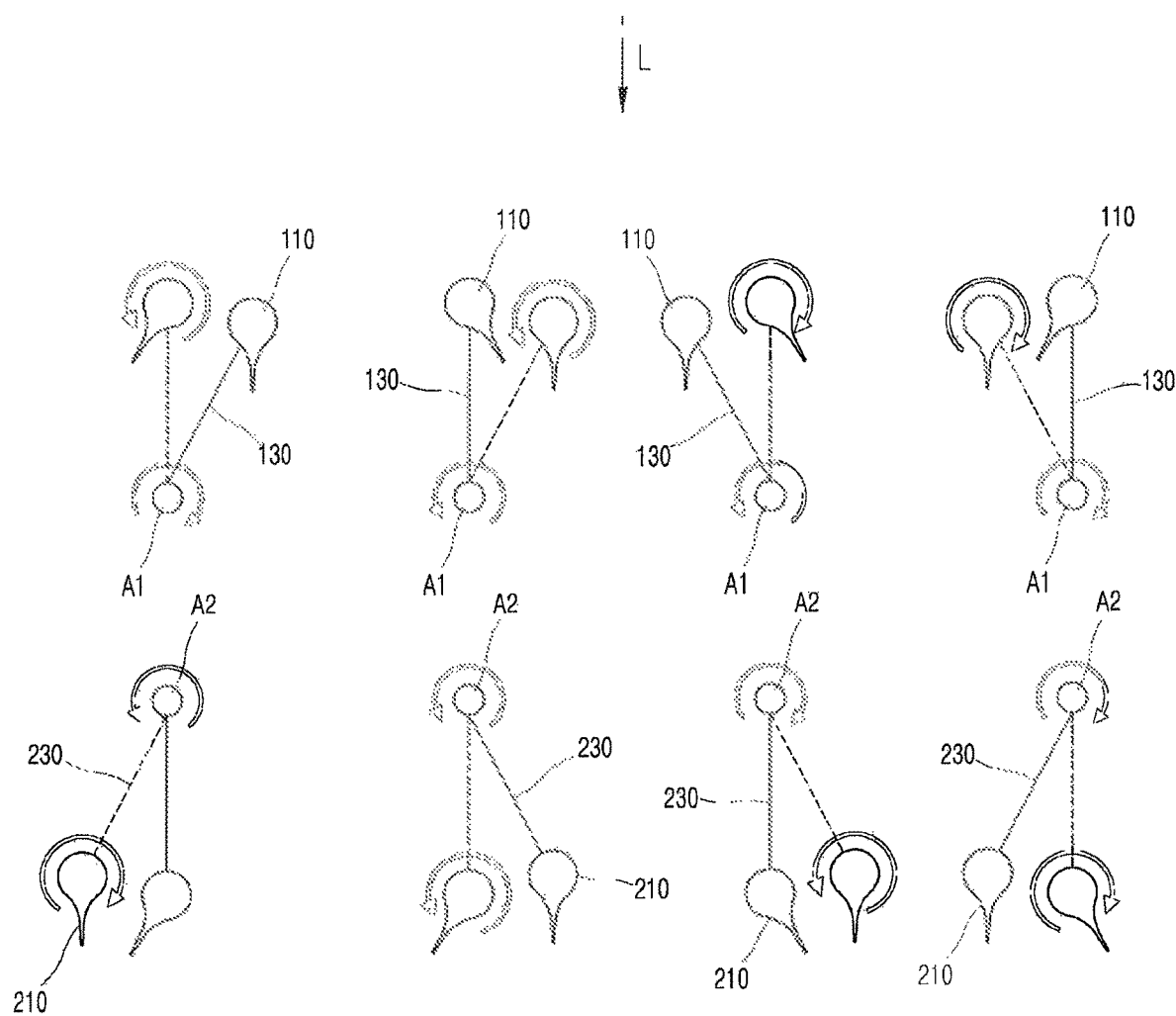
FIGS. 5A-5D are views illustrating a series of operations of the multiple oscillating water pumping device of FIG. 3 within a period.
Figure 6A:
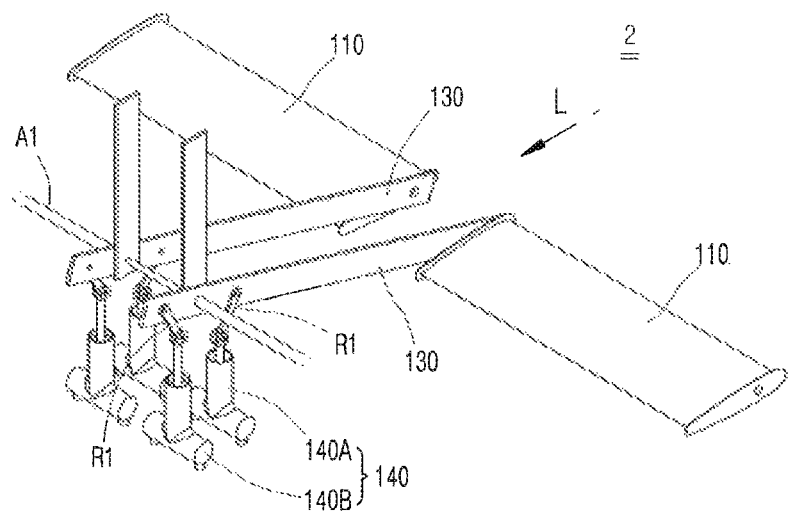
FIGS. 6A and 6B are views illustrating a state in which a multiple oscillating water pumping device, according to another embodiment of the present disclosure, is used.
Figure 6B:
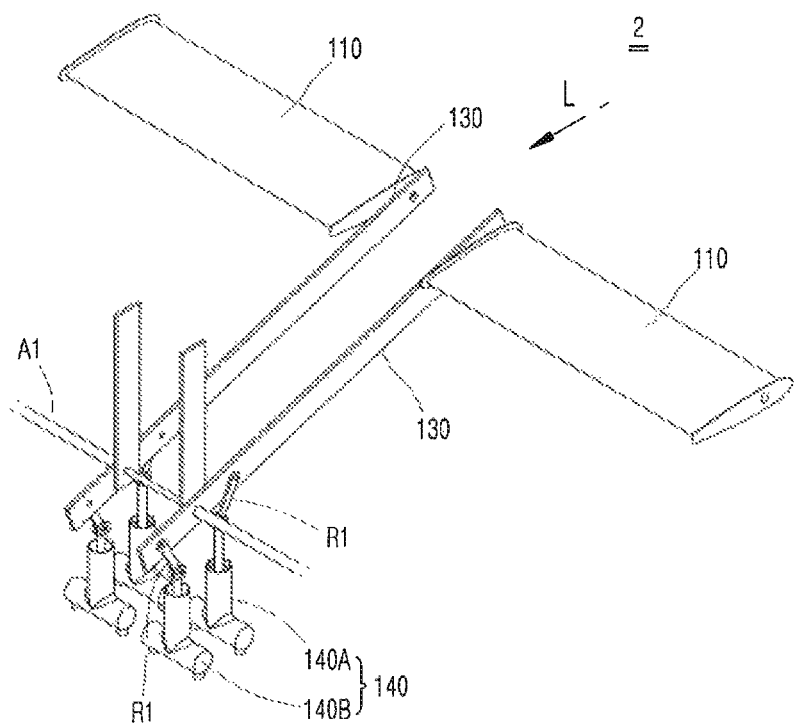

As illustrated in FIG. 5A, in the first period, the first arm 130 is rotated about the first pivot shaft A1 in the clockwise direction (by the lifting force acting on the first wing member 110) when the first wing member 110 rotates in the counterclockwise direction, and the second arm 230 is rotated about the second pivot shaft A2 in the counterclockwise direction (by the lifting force acting on the second wing member 210) when the second wing member 210 rotates in the clockwise direction.

In the first period a part of the clockwise rotating force of the first arm 130 is used as a part of the clockwise rotating force of the second wing member 210 through the first interlocking unit 300, and a part of the counterclockwise rotating force of the second arm 230 is used as a part of the counterclockwise rotating force of the first wing member 110 through the second interlocking unit 400.

As illustrated in FIG. 5B, in the second period, the first arm 130 is rotated about the first pivot shaft A1 in the counterclockwise direction when the first wing member 110 rotates in the counterclockwise direction, and the second arm 230 is rotated about the second pivot shaft A2 in the counterclockwise direction when the second wing member 210 rotates in the counterclockwise direction.

In the second period, a part of the counterclockwise rotating force of the first arm 130 is used as a part of the counterclockwise rotating force of the second wing member 210 through the first interlocking unit 300, and a part of the counterclockwise rotating force of the second arm 230 is used as a part of the counterclockwise rotating force of the first wing member 110 through the second interlocking unit 400.

As illustrated in FIG. 5C, in the third period, the first arm 130 is rotated about the first pivot shaft A1 in the counterclockwise direction when the first wing member 110 rotates in the clockwise direction, and the second arm 230 is rotated about the second pivot shaft A2 in the clockwise direction when the second wing member 210 rotates in the counterclockwise direction.

In the third period, a part of the counterclockwise rotating force of the first arm 130 is used as a part of the counterclockwise rotating force of the second wing member 210 through the first interlocking unit 300, and a part of the clockwise rotating force of the second arm 230 is used as a part of the clockwise rotating force of the first wing member 110 through the second interlocking unit 400.

As illustrated in FIG. 5D, in the fourth period, the first arm 130 is rotated about the first pivot shaft A1 in the clockwise direction when the first wing member 110 rotates in the clockwise direction, and the second arm 230 is rotated about the second pivot shaft A2 in the clockwise direction when the second wing member 210 rotates in the clockwise direction.

In the fourth period, a part of the clockwise rotating force of the first arm 130 is used as a part of the clockwise rotating force of the second wing member 210 through the first interlocking unit 300, and a part of the clockwise rotating force of the second arm 230 is used as a part of the clockwise rotating force of the first wing member 110 through the second interlocking unit 400.

Although not illustrated, the fluids discharged from the pair of first cylinders 140 and the pair of second cylinders 240 through the outlets G2 join together in the main tube and then flow toward the reservoir.

Referring to FIG. 3, the (1-1)th cylinder 140A discharges fluid to the main tube in the second and third periods due to an increase in the internal pressure, but does not discharge fluid to the main to be in the first and fourth periods due to a decrease in the internal pressure.

The (1-2)th cylinder 140B does not discharge fluid to the main tube in the second and third periods due to a decrease in the internal pressure, but discharges fluid to the main tube in the first and fourth periods due to an increase in the internal pressure.

The (2-1)th cylinder 240A discharges fluid to the main tube in the first and second periods due to an increase in the internal pressure, but does not discharge fluid to the main tube in the third and fourth periods due to a decrease in the internal pressure.

The (2-2)th cylinder 240B does not discharge fluid to the main tube in the first and second periods due to a decrease in the internal pressure, but discharges fluid to the main tube in the third and fourth periods due to an increase in the internal pressure.

Accordingly, the fluids discharged from the pair of first cylinders 140 and the pair of second cylinders 240 through the outlets G2 join together in the main tube while forming a phase difference of ¼ periods and form a continuous flow. The continuous flow of water may decrease the loss of head within the tube, thereby increasing the amount of water to be pumped.

As illustrated in FIGS. 6A and 6B, in the multiple oscillating water pumping device 2, according to the other embodiment of the present disclosure, a rotating shaft 111 of a first wing member 110 and a first pivot shaft A1 are arranged in a horizontal direction.

In the multiple oscillating water pumping device 2, according to the other embodiment of the present disclosure, the first wing member 110 reciprocally rotates about the first pivot shaft A1 in an up-down direction, and a first rotation means 120, a first arm 130, and a first cylinder 140 are all disposed below the surface of water accordingly.

The multiple oscillating water pumping device 2, according to the other embodiment of the present disclosure, operates in substantially the same way as the first water pumping unit 100 in the embodiment illustrated in FIG. 1, except that: the rotating shaft 111 of the first wing member 110 and the first pivot shaft A1 are arranged in the horizontal direction; and a pair of first arms 130 reciprocally rotates while sharing the first pivot shaft A1. Accordingly, a description of the other embodiment of the present disclosure will be omitted because it is substantially the same as the detailed description of the first water pumping unit 100.

Accordingly, the present disclosure may provide the multiple oscillating water pumping device 1 in which an interlocking unit transmits the rotating force of an arm at one side to a rotating shaft of a wing member at the other side, thereby making it possible to minimize the supply of a power source required for an operation.

Further, the present disclosure may provide the multiple oscillating water pumping device 1 in which one pair of first connecting rods R1, on the opposite sides of the first pivot shaft A1, is rotatably coupled with the first arm 130, there by making it possible to minimize the loss of head in the process in which pumped water flows toward a reservoir along a conduit.

In addition, the present disclosure may provide the multiple oscillating water pumping device 1 in which the rotating shaft 111 of the first wing member 110 is rotatably coupled with the first arm 130 outside fluid so that it is possible to prevent water pumping efficiency from being deteriorated by interference with rain or wind while only the minimum number of elements is that generate a lifting force using flow energy are disposed in fluid.

Although the specific embodiment of the present disclosure has been described above, it is apparent to those skilled in the art that the present disclosure is not limited to the embodiment disclosed herein and various modifications and changes can be made without departing from the spirit and scope of the present disclosure. Accordingly, modifications or variations should not be individually understood in view of the technical spirit of the present disclosure, and it must be understood the modifications and the variations belong to the claims of the present disclosure.

| Description of reference numerals |  |
|---|---|
| 1: Water pumping device | |
| 100: First water pumping unit | |
| 200: Second water pumping unit | |
| 110: First wing member | 210: Second wing member |
| 120: First rotation means | 220: Second rotation means |
| 130: First arm | 230: Second arm |
| A1: First pivot shaft | A2: Second pivot shaft |
| R1: First connecting rod | R2: Second connecting rod |
| 140: First cylinder | 240: Second cylinder |
| 141: Body | 241: Body |
| 142: Intake part | 242: Intake part |
| 143: Discharge part | 243: Discharge part |
| 144: First piston | 244: Second piston |
| C1: First check valve | 400: Second interlocking unit |
| C2: Second check valve | |
| G1: Inlet | |
| G2: Outlet | |
| 300: First interlocking unit | |
| P1: (1-1)th rotary member, (2-1)th rotary member | |
| P2: (1-2)th rotary member, (2-2)th rotary member | |
| P3: (1-3)th rotary member, (2-3)th rotary member | |
| P4: (1-4)th rotary member, (2-4)th rotary member | |

What is claimed is:

1. A multiple oscillating water pumping device, comprising:
    a first wing member disposed in a fluid to generate a lifting force using a flow energy of the fluid;
    a first rotation means configured to reciprocally rotate the first wing member to periodically change a direction of the lifting force acting on the first wing member;
    a first arm to which the first wing member is rotatably coupled, the first arm being reciprocally rotated about a first pivot shaft by the lifting force acting on the first wing member; and
    a pair of first cylinders where the fluid enters and exits according to an internal pressure that is periodically increased and decreased by a reciprocating motion of a respective pair of first pistons that are connected with the first arm through a respective pair of first connecting rods, the first connecting rods, on opposite sides of the first pivot shaft, being rotatably coupled with the first arm such that variations in the internal pressures of the first cylinders are reversed; and fluids that are discharged from the first cylinders join with each other in a main tube to form a continuous flow in the main tube;
    a second wing member disposed in the fluid to generate a lifting force using the flow energy of the fluid;
    a second rotation means configured to reciprocally rotate the second wing member to periodically change the direction of the lifting force acting on the second wing member;
    a second arm to which the second wing member is rotatably coupled, the second arm being reciprocally rotated about a second pivot shaft by the lifting force acting on the second wing member; and
    a second cylinder where fluid enters and exits according to the internal pressure that is periodically increased and decreased by the reciprocating motion of a second piston that is connected with the second arm through a second connecting rod,
    wherein the first and second arms are configured to reciprocally rotate while maintaining a predetermined phase difference therebetween.

2. The multiple oscillating water pumping device of claim 1, further comprising:
    a first interlocking unit configured to transmit a rotating force of the first arm to a rotating shaft of the second wing member; and
    a second interlocking unit configured to transmit the rotating force of the second arm to a rotating shaft of the first wing member,
    wherein the first and second arms are reciprocally rotated by the first and second interlocking units while maintaining a predetermined phase difference therebetween.

3. The multiple oscillating water pumping device of claim 1, wherein one pair of the second cylinders and one pair of the second connecting rods are provided; the second connecting rods, on opposite sides of the second pivot shaft, are rotatably coupled with the second arm such that variations in the internal pressures of the second cylinders are reversed; and fluids that are discharged from the first and second cylinders join with each other in the main tube to form a continuous flow in the main tube.

4. The multiple oscillating water pumping device of claim 2, wherein the first interlocking unit comprises: a (1-1)th rotary member coupled to the first pivot shaft and reciprocally rotated by the first arm; a (1-2)th rotary member coupled to the second pivot shaft so as to idle and configured to rotate in conjunction with the (1-1)th rotary member; and a (1-3)th rotary member coupled to the rotating shaft of the second wing member and configured to rotate in conjunction with the (1-2)th rotary member, and
    the second interlocking unit comprises: a (2-1)th rotary member coupled to the second pivot shaft and reciprocally rotated by the second arm; a (2-2)th rotary member coupled to the first pivot shaft so as to idle and configured to rotate in conjunction with the (2-1)th rotary member; and a (2-3)th rotary member coupled to the rotating shaft of the first wing member and configured to rotate in conjunction with the (2-2)th rotary member.

* * * * *